United States Patent
Gorrell et al.

(10) Patent No.: US 9,703,648 B2
(45) Date of Patent: *Jul. 11, 2017

(54) LOGICALLY PARTITIONING REMOTE VIRTUAL LIBRARY EXTENSIONS FOR USE IN DISASTER RECOVERY OF PRODUCTION DATA

(71) Applicant: Oracle International Corporation, Redwood City, CA (US)

(72) Inventors: Roland N. Gorrell, Westminster, CO (US); Frank Bochula, Prospect Heights, IL (US); Thomas R. Dawdy, Omaha, NE (US); Jeff Johnson, Thornton, CO (US); Vinnie Byrne, Brighton, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/406,079

(22) Filed: Jan. 13, 2017

(65) Prior Publication Data

US 2017/0123940 A1    May 4, 2017

Related U.S. Application Data

(63) Continuation of application No. 13/397,903, filed on Feb. 16, 2012, now Pat. No. 9,575,684.

(Continued)

(51) Int. Cl.
*G06F 12/02* (2006.01)
*G06F 12/14* (2006.01)

(Continued)

(52) U.S. Cl.
CPC ........ *G06F 11/1662* (2013.01); *G06F 3/0619* (2013.01); *G06F 3/0644* (2013.01); *G06F 3/0647* (2013.01); *G06F 3/0665* (2013.01); *G06F 3/0686* (2013.01); *G06F 3/065* (2013.01); *G06F 3/067* (2013.01); *G06F 3/0617* (2013.01); *G06F 9/46* (2013.01); *G06F 11/2094* (2013.01);

(Continued)

(58) Field of Classification Search
CPC ...... G06F 12/02; G06F 12/0246; G06F 12/14; G06F 2212/7206; G06F 2212/7209; G06F 9/46; G06F 3/0647; G06F 3/067; G06F 3/0617; G06F 3/065; G06F 3/0665; G06F 11/2094

See application file for complete search history.

(56) References Cited

U.S. PATENT DOCUMENTS 5,265,230 A * 11/1993 Saldanha .......... G11B 11/10597
369/275.2
5,742,792 A *  4/1998 Yanai .................... G06F 3/0601
710/1

(Continued)

*Primary Examiner* — Christopher D Birkhimer
(74) *Attorney, Agent, or Firm* — Marsh Fischmann & Breyfogle LLP; Jonathon A. Szumny

(57) ABSTRACT

Systems and methods that make use of logical partitions of a second tier of disk storage at a disaster recovery (DR) site remote from a production site as part of a DR setup to advantageously reduce disruption to production site data production operations during DR procedures while providing for the substantially immediate recall or retrieval of data previously migrated to the remote second tier of disk storage.

20 Claims, 8 Drawing Sheets

US 9,703,648 B2

Page 2

Related U.S. Application Data

(60) Provisional application No. 61/582,105, filed on Dec. 30, 2011.

(51) Int. Cl.
  *G06F 3/06* (2006.01)
  *G06F 11/20* (2006.01)
  *G06F 11/16* (2006.01)
  *G06F 9/46* (2006.01)

(52) U.S. Cl.
  CPC ......... *G06F 12/02* (2013.01); *G06F 12/0246* (2013.01); *G06F 12/14* (2013.01); *G06F 2201/805* (2013.01); *G06F 2201/815* (2013.01); *G06F 2212/7206* (2013.01); *G06F 2212/7209* (2013.01)

(56) References Cited

U.S. PATENT DOCUMENTS

| | | | | |
|---|---|---|---|---|
| 6,151,666 A * | 11/2000 | Blendermann | ...... | G06F 3/0608 711/170 |
| 6,260,110 B1 * | 7/2001 | LeCrone | ...... | G06F 3/0607 703/24 |
| 6,317,814 B1 * | 11/2001 | Blendermann | ...... | G06F 11/2087 707/999.202 |
| 6,789,161 B1 * | 9/2004 | Blendermann | ...... | G06F 3/0605 707/999.202 |
| 6,834,324 B1 * | 12/2004 | Wood | ...... | G06F 3/0605 710/305 |
| 6,925,525 B2 * | 8/2005 | Blendermann | ...... | G06F 3/0605 710/52 |
| 7,302,540 B1 * | 11/2007 | Holdman | ...... | G06F 11/1456 711/112 |
| 7,401,198 B2 * | 7/2008 | Johnston | ...... | G06F 3/0613 711/114 |
| 7,447,714 B1 * | 11/2008 | Mackrory | ...... | G06F 11/1464 707/659 |
| 7,620,765 B1 * | 11/2009 | Ohr | ...... | G06F 11/1448 711/162 |
| 7,743,205 B2 * | 6/2010 | Massey | ...... | G06F 3/0605 360/71 |
| 7,757,052 B2 * | 7/2010 | Bello | ...... | G06F 3/0611 711/154 |
| 7,761,426 B2 * | 7/2010 | Boyd | ...... | G06F 11/1471 707/655 |
| 7,774,566 B2 * | 8/2010 | Daily | ...... | G11B 20/1201 711/111 |
| 7,814,338 B2 * | 10/2010 | Johnson | ...... | G06F 3/0605 704/204 |
| 7,831,793 B2 * | 11/2010 | Chakravarty | ...... | G06F 11/1451 707/651 |
| 7,925,680 B1 * | 4/2011 | Mackrory | ...... | G06F 17/30067 707/812 |
| 8,082,408 B2 * | 12/2011 | Narayanan | ...... | G06F 11/1451 707/640 |
| 8,086,895 B2 * | 12/2011 | Maki | ...... | G06F 11/2028 711/162 |
| 2003/0028718 A1 * | 2/2003 | Blendermann | ...... | G06F 3/0605 711/111 |
| 2005/0207235 A1 * | 9/2005 | Blendermann | ...... | G06F 3/0605 365/189.05 |
| 2008/0263272 A1 * | 10/2008 | Blendermann | ...... | G06F 3/0605 711/111 |
| 2008/0263293 A1 * | 10/2008 | Kishi | ...... | G06F 3/0623 711/159 |
| 2008/0301363 A1 * | 12/2008 | Kitamura | ...... | G06F 3/0607 711/111 |
| 2009/0030954 A1 * | 1/2009 | Mackrory | ...... | G06F 11/1464 |
| 2009/0055582 A1 * | 2/2009 | Bish | ...... | G06F 3/0613 711/111 |
| 2009/0282203 A1 * | 11/2009 | Haustein | ...... | G06F 11/1461 711/162 |
| 2009/0327599 A1 * | 12/2009 | Nonaka | ...... | G06F 1/3203 711/112 |
| 2009/0327628 A1 * | 12/2009 | Narayanan | ...... | G06F 11/1451 711/162 |
| 2010/0030957 A1 * | 2/2010 | Hirashima | ...... | G06F 3/0608 711/111 |
| 2010/0185813 A1 * | 7/2010 | Muroyama | ...... | G06F 11/1658 711/111 |
| 2010/0228916 A1 * | 9/2010 | Massey | ...... | G06F 3/0605 711/115 |
| 2011/0167221 A1 * | 7/2011 | Pangal | ...... | G06F 11/1453 711/117 |

* cited by examiner

LOGICALLY PARTITIONING REMOTE VIRTUAL LIBRARY EXTENSIONS FOR USE IN DISASTER RECOVERY OF PRODUCTION DATA

CROSS REFERENCE TO RELATED APPLICATIONS

This application is a continuation of U.S. patent application Ser. No. 13/397,903, entitled "LOGICALLY PARTITIONING REMOTE VIRTUAL LIBRARY EXTENSIONS FOR USE IN DISASTER RECOVERY OF PRODUCTION DATA," and filed on Feb. 16, 2012, which claims priority from U.S. provisional application number 61/582,105, entitled "LOGICALLY PARTITIONING REMOTE VIRTUAL LIBRARY EXTENSIONS FOR USE IN DISASTER RECOVERY OF PRODUCTION DATA," and filed on Dec. 30, 2011, the entire contents of which are hereby incorporated into the present application by reference.

BACKGROUND

1. Field of the Invention

The present invention generally relates to the use of virtual tape libraries (VTLs) for use in disaster recovery (DR) of enterprise production data and, more specifically, to manners of migrating production data from a local VTL to one or more logical partitions of a remote, second-tier disk storage system such as a virtual library extension made up of virtual multi-volume cartridges (VMVCs) holding a plurality of virtual tape volumes (VTVs).

2. Relevant Background

Businesses and other organizations rely on data processing systems to manage a wide range of internal and external functions, including accounting and inventory functions, data management functions, and many others. Many of these systems must be available to be accessed over local or wide-area data processing system networks, including both private networks and public networks such as the Internet.

Data processing systems are often used in conjunction with hierarchical storage management (HSM). Generally, HSM is a data storage technique that monitors the way data is used and functions to move data between two or more "tiers" of storage. "Tiered storage" is a data storage environment made up of two or more kinds of storage that are delineated by differences in at least one of price, performance, capacity and function. For example, hard disk drive arrays and magnetic tape could represent first and second tiers of storage as hard disk drive arrays are associated with higher speed, higher cost and lower capacity while magnetic tape is associated with lower speed, lower cost and higher capacity. As another example, one type of hard disk storage associated with higher speed and lower capacity could be a first tier, another type of hard disk storage associated with lower speed and higher capacity could be a second tier, and a tape library storing tape drives (each of which reads and writes data on a length of magnetic tape) could be as third tier.

In a typical HSM scenario, frequently used data files are stored on a first storage tier (e.g., disk drives) but are eventually transferred or "migrated" to a second or additional storage tiers (e.g., tape) if they are not used after a certain period of time (e.g., a few months). Generally, data migration involves mapping data between storage tiers so as to provide a design for data extraction and data loading between the storage tiers (e.g., to relate data formats between the storage tiers). In any event, data may be automatically moved back to higher tiers (e.g., the first tier) if a user desires to reuse a file on a lower tier.

Long term data storage has traditionally involved use of storage tiers including tape drives due to the favorable unit cost and long archival stability of magnetic tape. Magnetic tape is often stored on removable tape cartridges which allows for the tape to be taken to off-site locations to provide for disaster recovery. A plurality of tape cartridges can be stacked to form a multi-volume cartridge (MVC).

While magnetic tape media presents favorable unit cost and long archival stability, many enterprises and other users desire for more "tape-less" data storage due to long recovery periods, security considerations, the onerous task of implementing non-full restores (e.g., non-sequential restores), and the like. However, many or most mainframe systems still require compatibility with tape drives as part of data storage and archiving. In this regard, VTLs (such as Oracle's Virtual Tape Storage Subsystem (VTSS)) are now being used, each of which is generally in the form of a hard disk storage system that emulates tape libraries or tape drives for use with existing backup software. VTLs generally make use of VTVs which are direct access storage device (DASD) buffers that appear to the operating system as a real tape volume. Data can be written to and read from a VTV and the VTV can be migrated to and recalled from real tape volumes. Multiple VTVs can be stored within a virtual MVC (VMVC).

In the event of a "disaster," which can include both actual natural disasters and other events, a primary system at a production site may be "down" or otherwise unavailable leading to disruption of operations, lost revenue, and the like. In this regard, many businesses and other enterprises maintain or otherwise implement DR systems or operations which broadly include redundant systems that provide some or all of the functions of the primary systems and typically include full backups of all the data available to the primary systems. In this way, users can, in the event of a disaster, transition to the DR environment until the primary system can be restored, thus reducing lost productivity.

A DR strategy generally has a number of basic components such as migrating or otherwise moving data from a production site to one or more storage tiers or systems of a DR site (e.g., typically at a location that is geographically remote from the production site, such as a different city, different state, and the like), testing one or more DR plans, deploying the DR plan(s) in the event of an actual disaster, and returning to normal operations after a DR test or actual disaster. Testing the recoverability of data and/or software allows the user to validate that its personnel, its information technology (IT) infrastructure, the host software and the storage product itself can handle an unexpected disaster. For instance, the production site of a particular DR setup may include one or more production hosts along with a number of storage tiers and the DR site of the DR setup may be located at a remote distance from the production site and also include one or more storage tiers. Data written to the production storage tiers may also be replicated to one or more storage tiers at the DR site thus providing a secondary copy of the data in the event the production site data or software is lost.

FIG. 1 illustrates a schematic diagram of one type of DR setup 100 made up of a production site 104 and a remote DR site 108 and including the use of one or more VTLs. The production site 104 includes a host 112 (e.g., mainframe) including any appropriate operating system (not shown) that is operable to generate or otherwise manipulate production data. The host 112 includes a host software component (HSC) 116 (e.g., such as Oracle's Virtual Tape Control System (VTCS)) that is broadly operable to create VTVs from the production data and administer migration of the VTVs from host 112 to a first storage tier such as VTL 124 (e.g., such as Oracle's Virtual Tape Storage Subsystem (VTSS)) according to any appropriate enterprise policies (e.g., upon production data being created, according to any appropriate schedule, and the like). Even though the production data is being stored on disk drives on the VTL 124, the HSC 116 interacts with the VTL 124 as if the data is being stored on actual tape drives.

As part of the generation and migration of production data to the VTL 124, one or more production control data sets (CDS s) 120 may also be generated and stored in any appropriate manner. Once a copy of the production data is stored in VTVs in the VTL 124, additional copies of the VTVs are migrated according to any appropriate migration policies (e.g., according to data type, percentage of VTL 124 occupied, any appropriate schedule, and the like) to one or more second storage tiers such as a local tape library 128 and a tape library 132 at the DR site 108 (e.g., via a channel extension). Upon declaration of a disaster at the production site 104 as part of a DR test, the VTV copies stored in the tape library 132 can be recalled to a first tier storage system at the DR site 108 such as VTL 136 at the DR site 108.

SUMMARY

The use of tape libraries can present a number of problems in the DR context such as when the one or more physical MVCs in a remote tape library have been lost, damaged, accidentally overwritten, misplaced, and/or the like. Even if the physical MVCs can be found and in good condition, the data may still not be readable due to difficulties with the storage media including defects, localized damage, wear, aging, and the like. Still further, retrieving data from MVCs of a remote tape library often involves considerable delay and may otherwise be a cumbersome process.

The inventors have determined that incorporating one or more scalable second tiers of disk storage (such as Oracle's Virtual Library Extension (VLE)) into a DR setup that includes one or more first tiers of disk storage can advantageously reduce the delay in retrieving production data from a remote DR site, increase the fidelity of recovered production data, and the like. That is, rather than migrating data from a first tier of disk storage with relatively fast access speeds (e.g., a VTL) at a production site to a real tape library at a DR site, the data is instead migrated from the first tier of disk storage at the production site to a second tier of disk storage (e.g., having slower access speeds than the first tier of disk storage but faster access speeds than a real tape library) at a DR site before, if at all, being migrated to a real tape library (where the real tape library would become a third storage tier). Advantageously, users can maintain active data on disk media for longer periods of time (e.g., as compared to migrating data from a VTL directly to a real tape library) to facilitate data recall performance before migrating the data to tape media for longer term storage. By reducing tape activity, a second disk storage tier such as a VLE can reduce wear and tear on tape resources and further improve the reliability of VTLs.

More specifically, systems and methods disclosed herein include logically partitioning a second tier of disk storage such as a VLE at a DR site (e.g., located geographically remote from a production site) into a number of MVC "pools" (e.g., each made up of a range of VMVCs) so that one or more of the MVC pools can be used to store ongoing production data (e.g., from a production site) while one or more of the other MVC pools can be used as part of a DR test. Stated differently, logically partitioning a VLE at a DR site allows the VLE to concurrently store production data while providing quick and efficient access to data that needs to be retrieved as part of a DR test or an actual DR. As will be discussed, logically partitioning a DR site VLE for use in DR allows customers and other users to at least substantially avoid use of an active mainframe host, an active VTL, or an active disk CDS at the DR site other than during the DR test. Furthermore, production data may be substantially immediately available upon declaration of an actual DR or a DR test (e.g., over an IP link). Still further, customers can at least substantially avoid the scratching of tapes during a DR test (e.g., as DR copies are kept separate from production copies in the MVC pools), maintain DR data at the VLE only as long as they desire to do so (e.g., via integrated use of archival policies), and keep production data safe during a DR (e.g., via restricting physical access to a local, production site VLE during the DR), among other advantages.

In one aspect, a method for use in DR includes storing a first production dataset in one or more VTVs of a VTL at a production site, where the VTL is a first tier of disk storage having a first access time and a first capacity; migrating copies of the one or more VTVs storing the first production dataset from the production site VTL to a first of a plurality of logical partitions of a VLE at a DR site over at least one network, where the DR site VLE is a second tier of disk storage having a second access time and a second capacity, and where at least one of: a) the second access time is slower than the first access time, and b) the second capacity is greater than the first capacity; and migrating copies of the one or more VTVs storing the first production dataset from the production site VTL to a local storage system (e.g., VLE, real tape library) at the production site.

During a DR procedure at the production site, the method may include migrating copies of VTVs storing a second production dataset generated after the DR declaration from the production site VTL to a second of the plurality of logical partitions at the DR site VLE. Stated differently, data generated or otherwise modified at the production site before the DR procedure declaration is migrated into the first logical partition of the DR site VLE and data generated or otherwise modified at the production site during the DR procedure is migrated into the second logical partition. The first logical partition can then be audited to obtain the first dataset and populate one or more CDSs at the DR site as part of the DR procedure. In one arrangement, the first logical partition can be marked as read-only upon DR procedure declaration as to the DR site to increase the veracity of the DR procedure. Advantageously, little or no disruption to organizational data production operations results upon declaration of the DR procedure because newly generated or modified production data after the DR procedure declaration is seamlessly migrated to the second logical partition of the DR site VLE while DR testing focuses on data generated or modified before declaration of the DR procedure which is stored in the first logical partition.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein are DR setups and procedures that make use of logical partitions of one or more remote second tiers of disk storage such as one or more remote VLEs to advantageously reduce disruption to production site data production operations during DR tests while providing for the substantially immediate recall or retrieval of data previously migrated to the one or more remote VLEs. As used herein, "logical partitions" are specific, designated portions of a second tier of disk storage (e.g., such as MVC pools, where each MVC pool is made up of a range of VMVCs) that can be accessed and/or written to by certain entities and are restricted from access and/or writing by other entities. For example, and as will be discussed, production data of a production site can be written to a first logical partition of the remote VLE before declaration of a DR procedure (e.g., a DR test) and then to a second logical partition of the remote VLE after declaration of the DR procedure. While the DR site may have read-only access to the data in the first logical partition during the DR procedure, it may have no access to and not even be aware of the data in the second logical partition. Similarly, the DR site may be able to write data to a third or additional logical partition(s) during the DR procedure which may be inaccessible to the production site. In this regard, logically partitioning a VLE as disclosed herein can advantageously support DR efforts for a plurality of production sites.

Figure 1:
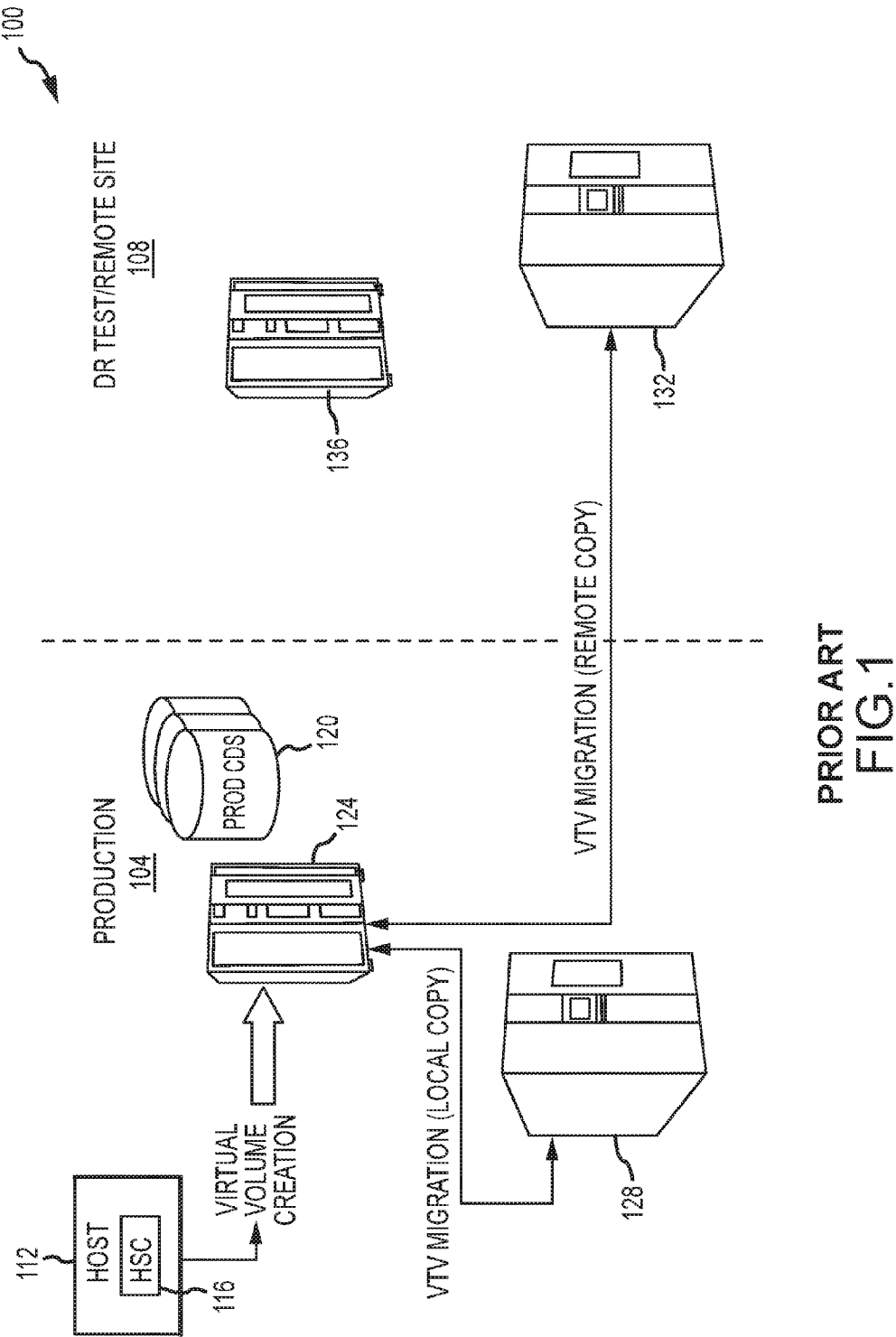
FIG. 1 is a schematic diagram of a prior art DR setup between a production site and a DR site.
Figure 2:
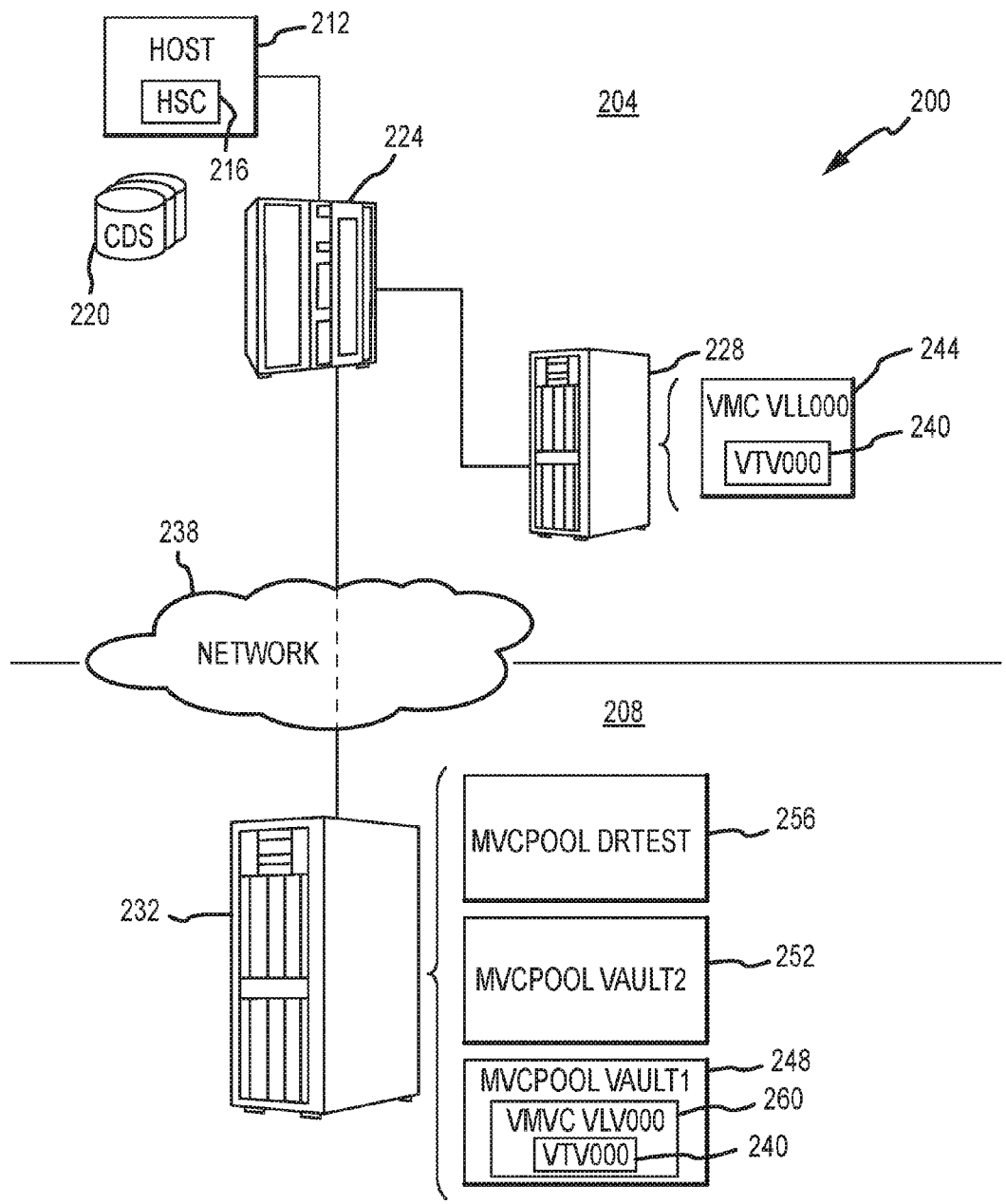
FIG. 2 is a schematic diagram of a DR setup between a production site and a DR site that illustrates migration of data from the production site to a first logical partition of a remote VLE at the DR site, according to one embodiment.

Turning now to FIG. 2, a DR setup 200 between an organization's production site 204 and a DR site 208 located remote from the production site 204 according to one embodiment is illustrated. The production site 204 includes a host 212 (e.g., mainframe) including any appropriate operating system (not shown) that is operable to generate or otherwise manipulate production data, such as one or more datasets. The host 212 may include a host software component (HSC) 216 (e.g., such as Oracle's Virtual Tape Control System (VTCS)) that is broadly operable to store the production data in VTVs and administer migration of the VTVs to at least one first tier of disk storage such as VTL 224 (e.g., Oracle's Virtual Tape Storage Subsystem (VTSS)) according to any appropriate enterprise policies (e.g., upon production data being created, according to any appropriate schedule, and the like). As part of the generation and migration of production datasets to the VTL 224, one or more production CDSs 220 may also be generated and stored in any appropriate manner.

Once production datasets are stored in VTVs in the VTL 224, the VTVs may be migrated according to any appropriate migration policies (e.g., according to data type, percentage of VTL 224 occupied, any appropriate schedule, and the like) from the VTL 224 to at least one local, production site second storage tier such as a VLE 228 (e.g., and/or a tape library). For instance, a VTV 240 ("VTV000")(or a copy thereof) storing a first production dataset may be migrated into a VMVC 244 ("VLL000") of the production site VLE 228. A copy of the VTV 240 may also be migrated over one or more networks 238 (e.g., via TCP/IP) to at least one second tier of disk storage at DR site 208 such as VLE 232. For instance, the production site VTL 224 may have a first access time and a first capacity and the DR site VLE 232 (and/or other VLEs disclosed herein) may have a second access time and a second capacity. In one arrangement, either the first access time may be quicker than the second access time and/or the first capacity may be less than the second capacity.

The DR site VLE 232 may include a plurality of logical partitions of VMVCs such as a first logical partition or MVC pool 248 ("Vault 1"), a second logical partition or MVC pool 252 ("Vault 2") and a third logical partition or MVC pool 256 ("DR Test"). For instance, the first MVC pool 248 may be made up of a range of VMVCs such as "VLV000-VLV099," the second MVC pool 252 may be made up of a range of VMVCs such as "VLV100-VLV119," and the third MVC pool 256 may be made up of a range of VMVCs such as "VLV120-VLV200." As shown, the copy of VTV 240 may be migrated or otherwise written to one 260 of the VMVCs ("VLV000") in the first MVC pool 248.

Figure 3:
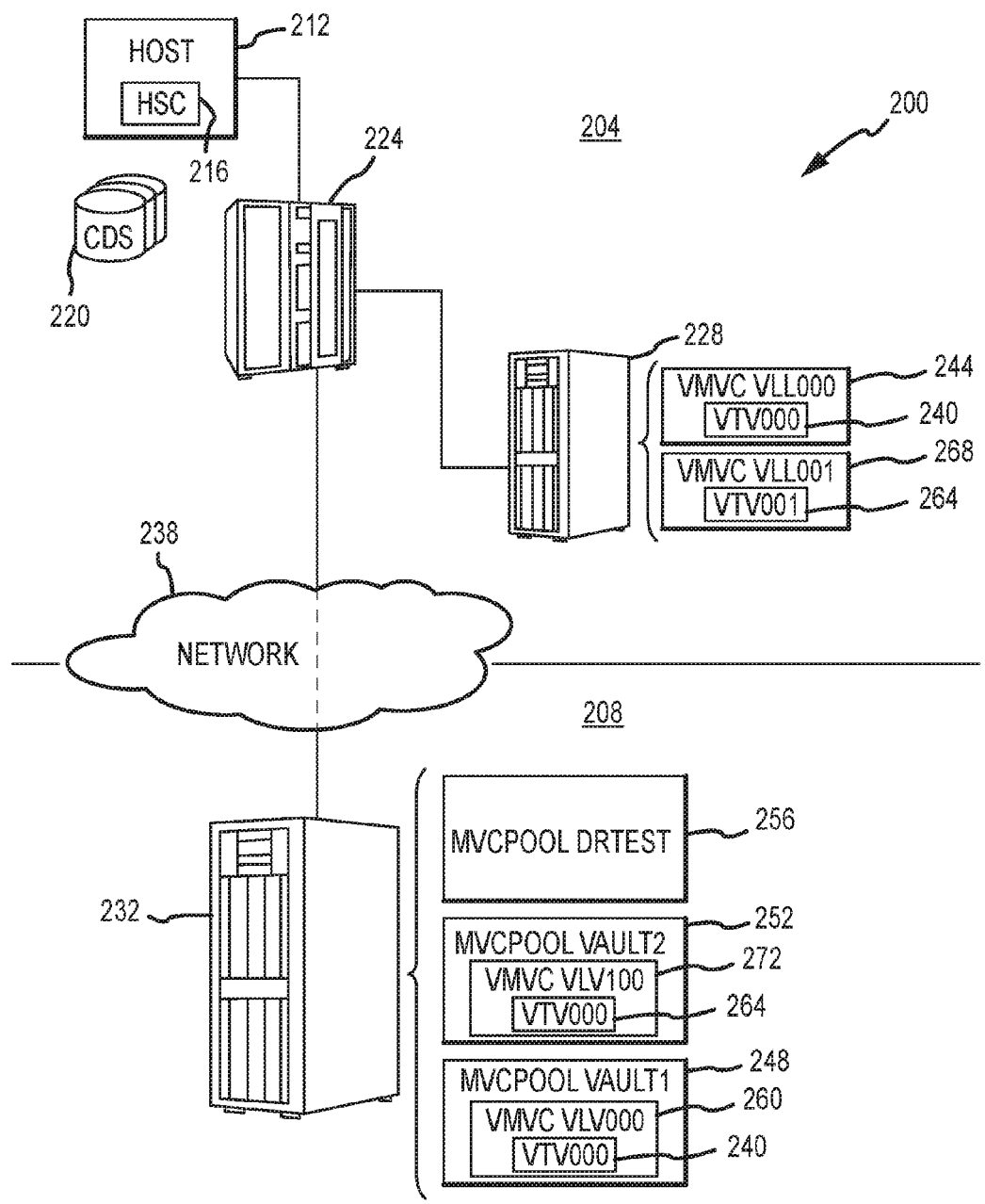
FIG. 3 is a schematic diagram of the DR setup of FIG. 2, but illustrating migration of data generated or modified at the production site during a DR procedure to a second logical partition of the remote VLE at the DR site.

FIG. 3 illustrates the DR setup 200 after declaring a start to a DR procedure (e.g., a DR test). As can be seen, a new production dataset (e.g., a second production dataset) generated at the production site 204 (e.g., via host 212) after declaration of the DR procedure may now be stored within a VTV 264 ("VTV001") in the production site VTL 224 and appropriately migrated from the production site VTL 224 into a VMVC 268 in the production site VLE 228. Furthermore, a copy of the VTV 268 may also be migrated from the production site VTL 224 over the one or more networks 238 to one 272 of the VMVCs ("VLV100") of the second MVC pool 252 in the DR site VLE 232. In this regard, it should be noted how datasets generated or at least modified at the production site 204 before declaration of the DR procedure may be stored within the first MVC pool 248 while datasets generated or at least modified at the production site 240 after declaration of the DR procedure may be stored within the second MVC pool 252. For instance, a dataset such as "MGMTCLAS" may be loaded at the production site (e.g., into host 212) to substantially seamlessly steer new production datasets to the second MVC pool 252 in the DR site VLE 232. In conjunction with the steering of new datasets to the second MVC pool 252, the first MVC pool 248 may be marked as "read-only" to limit changes to VTV 240 so as to enhance the accuracy of DR of the first dataset in the VTV 240. For instance, the "MVCMAINT" utility may be run to set a "READONLY" flag against the particular VMVC range of the first MVC pool 248.

Figure 4:
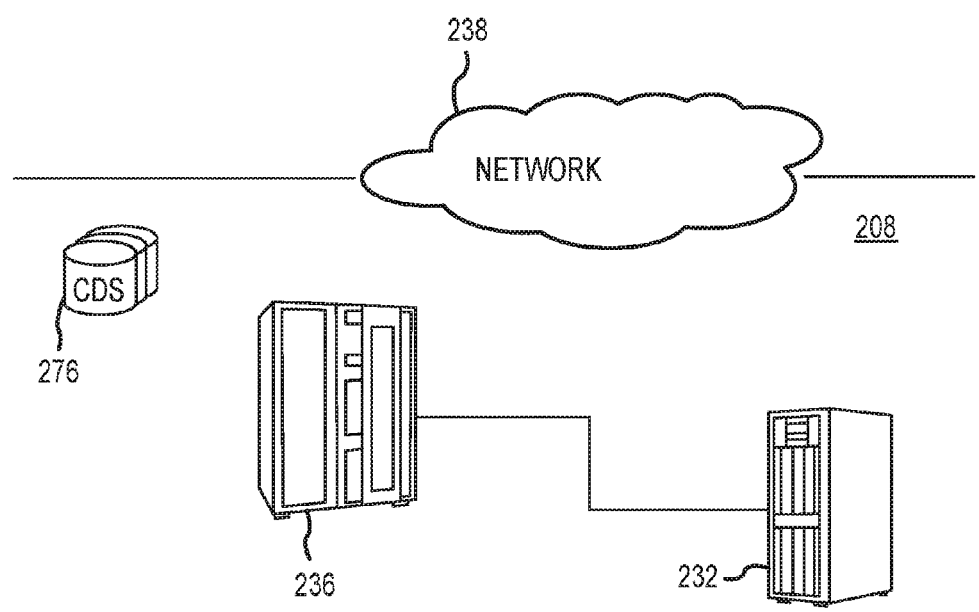
FIG. 4 is a schematic diagram of a portion of the DR setup of FIG. 3 and illustrating DR site CDSs which are populated with data audited from the first logical partition of the remote VLE at the DR site.

FIG. 4 is a schematic diagram of a portion of the DR setup of FIG. 3 and illustrating one or more CDSs 276 at the DR site 208 which may be populated with data audited from the DR site VLE 232 after declaration of the DR procedure. In one arrangement, the CDSs 276 may be created "on the fly" upon declaration of the DR procedure. In any case, the CDSs 276 at the DR site 208 may initially be empty upon declaration of the DR procedure and before the recall or retrieval of data from the DR site VLE 232 into such CDSs 276. To recall or retrieve data from the DR site VLE 232, one or more of the MVC pools of the DR site VLE 232 may be audited (e.g., via an "MVC AUDIT" utility or the like) to obtain copies of VTVs that store the data to be retrieved. Thereafter, the one or more CDSs 276 may be populated with the audited and obtained data and appropriately utilized to confirm success of the DR procedure and/or otherwise perform DR testing.

As part of a DR test, the MVC pool(s) storing the production data migrated to the DR site VLE 232 before declaration of the DR test may be appropriately audited. For instance, the VMVC range of "VLV000-VLV099" of the first MVC pool 248 may be audited to obtain a copy of VTV 240 ("VTV000") which may be used to populate one or more of the CDSs 276. As part of an actual disaster, the MVC pools storing production data migrated to the DR site VLE 232 both before and after declaration of the actual DR procedure may be audited. For instance, the VMVC ranges of the first and second MVC pools 248, 252 may be audited to respectively obtain copies of the VTV 240 and VTV 264 which may be used to populate one or more of the CDSs 276. Additionally, any appropriate utility (e.g., such as a "RECALL MGMTCLAS") may be utilized to recall more immediate data needs into a VTL 236 at the DR site 208.

Figure 5:
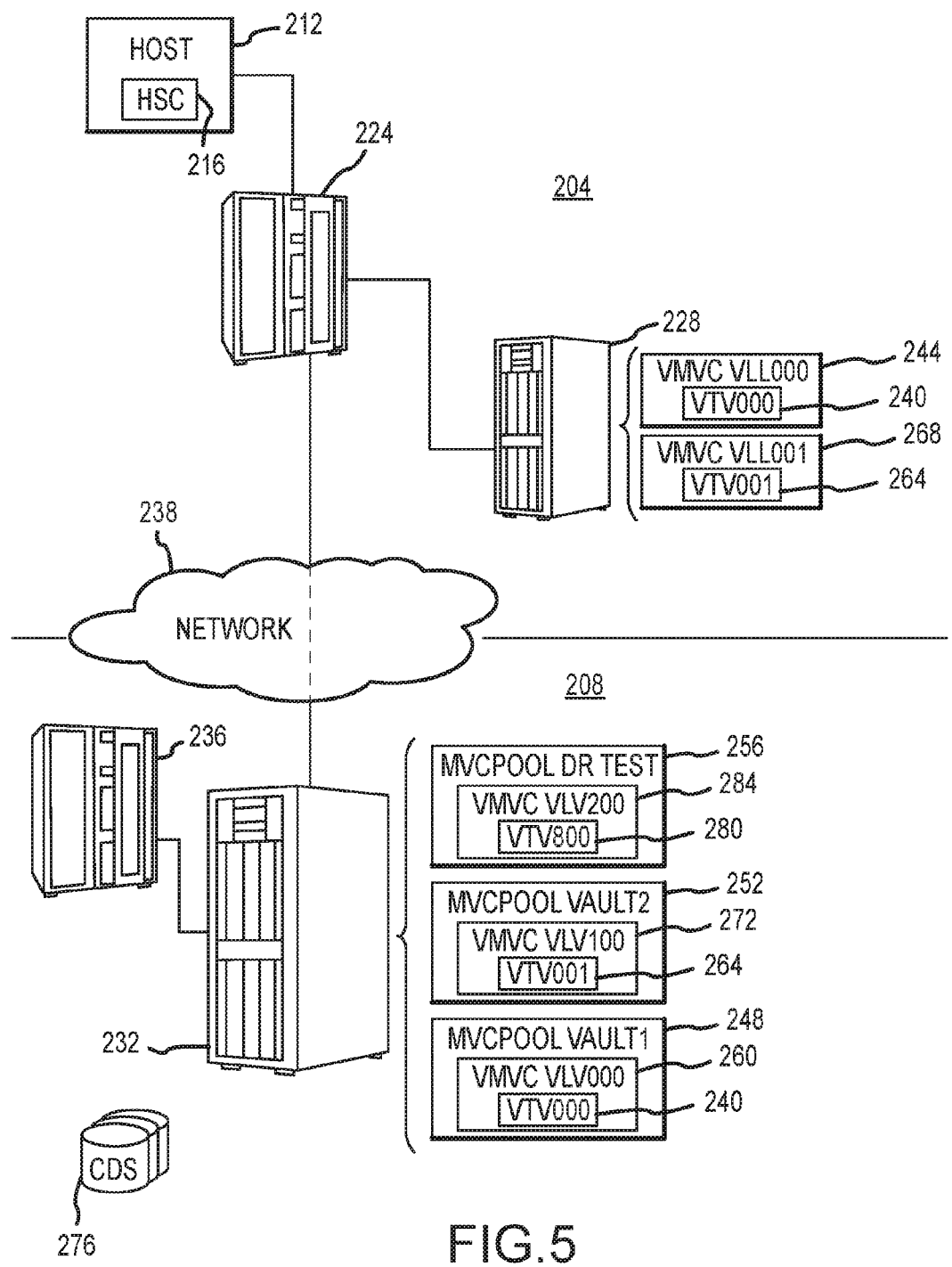
FIG. 5 is a schematic diagram of the DR setup of FIG. 3 that illustrates migration of data generated or modified at the DR site during the DR procedure to a third logical partition of the remote VLE at the DR site.

One or more of the MVC pools of the DR site VLE 232 may also be used to store data created at the DR site 208 (e.g., via a DR site host, not shown) during the DR procedure. That is, data created or modified at the DR site 208 during the DR procedure may be stored in the DR site VTL 236 and then locally migrated (local as to DR site 208) to one or more of the MVC pools of the DR site VLE 232. Turning now to FIG. 5, a new production dataset generated at the DR site 208 during the DR procedure (e.g., as part of DR testing) may be stored within a VTV 280 ("VTV800") in the DR site VTL 236 and then locally migrated to a VMVC 284 ("VLV200") in the third MVC pool 256. As discussed previously, each MVC pool represents a specific, logical partition of the DR site VLE 232 that may be restricted from use by certain entities and/or not even made known to certain entities. For instance, the DR site 208 has read-only access to the first MVC pool 240 (e.g., for use as part of retrieving production data generated before declaration of the DR procedure). As another example, the production site 204 and the DR site 208 may have no knowledge of data generated by each other during the DR procedure. For instance, the second and third MVC pools 252, 256 may be respectively hidden from DR site 208 and the production site 204.

Maintaining such separation of production and DR site datasets advantageously allows customers to avoid or limit the effort and expense associated with implementation of tape scratching routines. For instance, the DR site 208 can avoid having to perform tape scratching routines with the third MVC pool 256 when some of the production data in the second MVC pool 252 of the DR site VLE 232 has expired. Similarly, a decision to perform a tape scratching routine of one of the second and third MVC pools 252, 256 advantageously does not affect the other of the second and third MVC pools 252, 256. Furthermore, DR site data (e.g., in the third MVC pool 252) may be kept in the DR site VLE 232 for only long as customers desire it to be there (e.g., via one or more archival policies, such as via "ARCHPOL" parameters).

Figure 6:
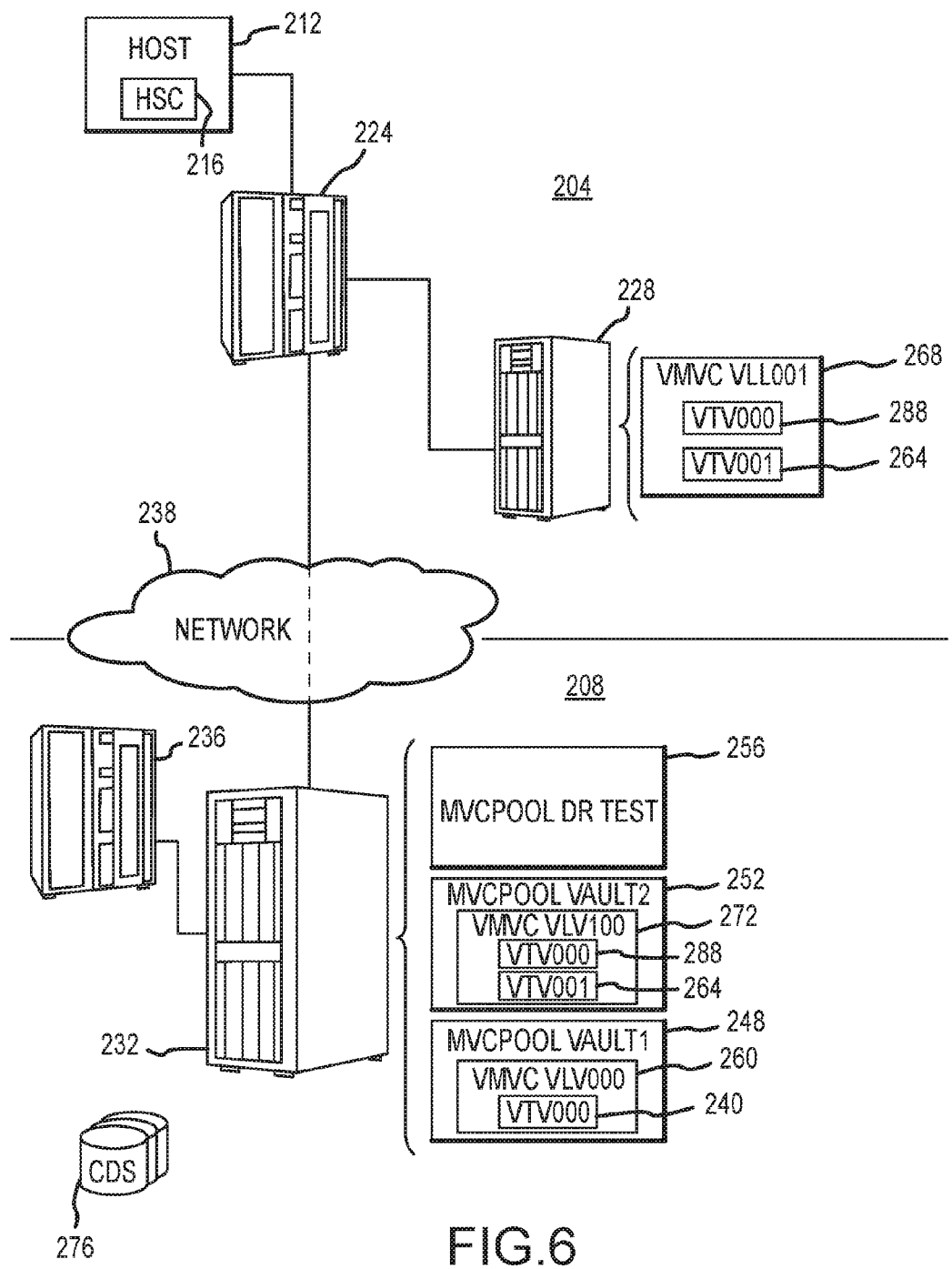
FIG. 6 is a schematic diagram of the DR setup of FIG. 3 according to another embodiment.

Production datasets generated before declaration of a DR procedure can be modified during the DR procedure at the production site 204. Turning to FIG. 6, VTV 288 represents a modified version of the first production dataset created at the production site and originally represented as VTV 240 in FIG. 3. Stated differently, VTV 240 represents an original version of "VTV000" while VTV 288 represents a modified version of "VTV000." The modified VTV 288 may be migrated from the production site VTL 224 both to the production site VLE 228 (e.g., within VMVC 268) and to the DR site VLE 232 (e.g., within VMVC 272 of the second MVC pool 252). As shown, the original or previous VTV 240 continues to reside in VMVC 260 of the first MVC pool 248. In this regard, any DR testing would continue to work with the original or previous VTV 240 and may even be unaware that modified or updated VTV 288 even exists. This arrangement advantageously illustrates how the logical partitions (MVC pools) of the DR site VLE 232 allow for reduced or minimal disruption to production operations at the production site 204. That is, the production site 204 can modify "VTV000" at least substantially free of concern that doing so might interfere with DR testing at the DR site 208.

Production datasets generated before declaration of a DR procedure can also be modified during the DR procedure at the DR site 208. For instance, and with reference now to FIG. 7, VTV 240 (the original or previous version of "VTV000") may be read from the first MVC pool 248 (which may involve auditing the first MVC pool 248) into the DR site VTL 236 for use as part of DR testing. Thereafter, VTV 292 (i.e., a modified version of "VTV000") may be migrated into the third MVC pool 256 (i.e., the DR test MVC pool). In this regard, it can be seen how a plurality of different versions of "VTV000" (e.g., VTV 240, VTV 288 and VTV 292) can each be maintained in separate MVC pools in the DR site VLE 232 and their respective integrities maintained.

Upon declaration of a completion of the DR procedure, the DR site 208 may be appropriately cleaned up so as to remove metadata from the DR site VTL 236 and DR site VLE 232 so that subsequent DR procedures are not aware of such metadata. For instance, a "SCRATCH" utility may be run to scratch or otherwise remove all VTVs created during the DR procedure from both the DR site VTL 236 and from the DR test MVC pool of the DR site VLE 232 (e.g., the third MVC pool 256). By scratching VTVs in the DR test MVC pool after the DR procedure, the amount of time required to clean up the DR site VTL 236 and the amount of data left in the DR site VLE 232 after the DR procedure can be reduced. Additionally, the DR site VTL 236 may be migrated to a zero threshold to empty the contents of the cache of the DR site VTL 236 to reduce the likelihood that data from a prior DR procedure contaminates or otherwise affects a current DR procedure. An audit procedure can be run against the DR site VTL 236 to verify emptying of the cache contents.

The production site 204 may also be cleaned up after completion of the DR procedure. For instance, the first production dataset of the production site 204 created before DR procedure declaration (e.g., associated with VTV 240) and the second production dataset of the production site 204 created after DR procedure declaration (e.g., associated with VTV 264) may each be reloaded into one or more VTVs of the production site VTL 224 so as to steer all writes or migrations to the production site VLE 228 and back to the first MVC pool 248. Also, the second MVC pool 252 may be emptied and otherwise primed for one or more subsequent DR procedures.

Figure 8:
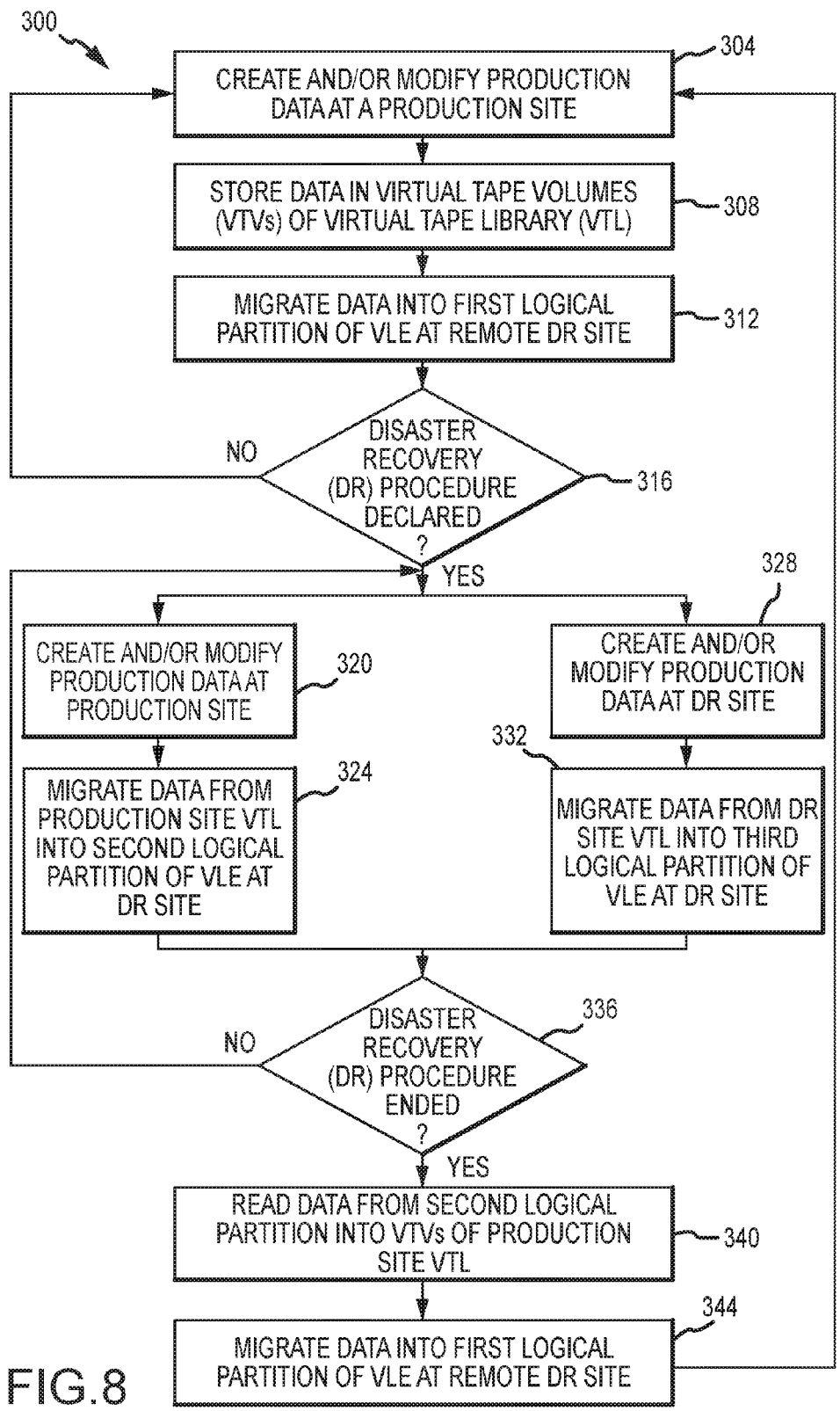
FIG. 8 is a flow chart illustrating steps for use in migrating production data from a production site to one or more VLEs of one or more remote DR sites according to one embodiment.

FIG. 8 is a flow chart or method 300 illustrating steps that may be performed by any appropriate logic, software or other computer readable instructions (e.g., HSC 216 and/or others) for use in migrating production data to one or more remote DR sites (e.g., as part of DR setup 200). At 304, production data may be created and/or edited at a production site which may thereafter be stored in VTVs of a first disk storage tier such as a VTL at the production site at 308. With reference to FIG. 2, for instance, host 212 may manipulate production data (e.g., payroll data) in any appropriate manner which may be stored in VTVs of VTL 224 (e.g., via HSC 216) according to any appropriate data storage policies. While only a single VTL 224, VLE 228, and the like are shown in FIG. 2, the DR setup may have more than one VTL 224, VLE 228, and the like as appropriate.

Returning to FIG. 8, the method 300 may also include migrating 312 the production data from the production site VTL into a first logical partition of a second disk storage tier (e.g., having a greater capacity and/or slower access time than that of the first disk storage tier at the production site) such as a VLE at a remote DR site according to any appropriate policies. As shown in FIG. 2, VTV 240 ("VTV000") or copies thereof may be migrated from production site 224 into first MVC pool 248 of DR site VLE 232 via network(s) 238. While not shown in FIG. 8, some embodiments include additionally migrating the production data from the production site VTL into a local, production site VLE (e.g., from production site VTL 224 into production site VLE 228, such as into VMVC 244). In one arrangement, the VMVC 244 may also be part of one or more logical partitions or MVC pools of the production site VLE 244.

In any event, the method 300 may query at 316 whether a DR procedure (e.g., a DR test) has been declared or otherwise established. In response to a negative determination at 316, the method 300 may cycle back to 304 whereby production data that is created and/or modified 304 is stored 308 in VTVs of the production site VTL and eventually migrated to the first logical partition of the DR site VLE (and possibly additional to the production site VLE). However, if it is determined at 316 that a DR procedure has been declared, then production data that is created and/or modified after DR procedure declaration begins to be migrated to one or more logical partitions of the DR site VLE separate from the first logical partition. Stated differently, while production data created and/or modified before DR procedure declaration is migrated to a first logical partition of the DR site VLE, production data created and/or modified after DR procedure declaration is migrated to one or more other logical partitions of the DR site VLE (e.g., a second logical partition, a third logical partition, and/or the like).

In this regard, the DR site (e.g., DR site 208) can perform any appropriate recovery and testing of production data stored in the first logical partition of the DR site VLE (i.e., data created and/or modified before declaration of the DR procedure) while the production site (e.g., production site 204) can substantially seamlessly continue its operations during the DR procedure by migrating production data to a second or additional logical partition of the DR site VLE. Furthermore, such production data may be free from being altered, deleted, and/or the like by the DR site(s) as at least some embodiments envision that the DR site may have no access to and may not even be aware of the production data in the second or additional logical partition(s) of the DR site VLE.

With continued reference to FIG. 8, production data that is created and/or modified 320 at the production site once a DR procedure has been declared may be migrated 324 from the production site VTL into a second logical partition of the DR site VLE. Turning to FIG. 3, for instance, VTV 264 ("VTV001") may be migrated from production site VTL into VMVC 272 of second MVC pool 252 of DR site VLE as well as into VMVC 268 of production site VLE 228. As another example, and as shown in FIG. 6, the production site 204 (e.g., the host 212) may modify previously created data (e.g., such as that corresponding to the original version of "VTV000") and then migrate the modified version as VTV 288 into VMVC 272 of second MVC pool 252 of DR site VLE 232 as well as into VMVC 268 of production site VLE 228.

Figure 7:
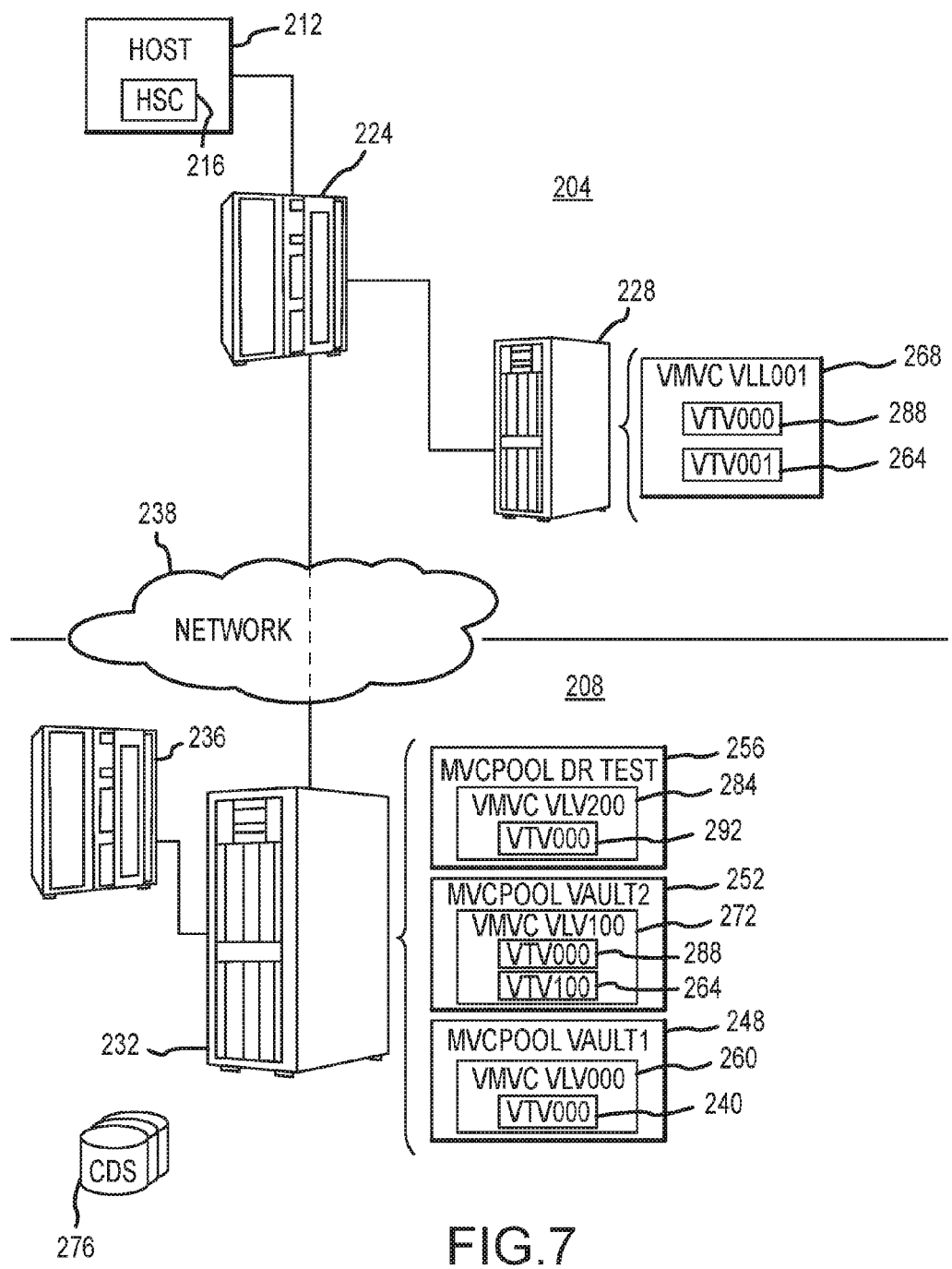
FIG. 7 is a schematic diagram of the DR setup of FIG. 6 according to another embodiment.

As also shown in FIG. 8, production data that is created and/or modified 320 at the DR site once a DR procedure has been declared may be migrated 324 from a first disk storage tier at the DR site (such as a DR site VTL) into a second logical partition of the DR site VLE. For instance, and with reference to FIG. 5, a production dataset created at the DR site 208 (e.g., at a DR site host, not shown) may be migrated as VTV 280 ("VTV800") from DR site VTL 236 into VMVC 284 of third MVC pool 256 of DR site VLE 232. With reference to FIG. 7, the DR site 208 may also function to modify production data as part of DR testing. For instance, a DR site host (not shown) may read the dataset of VTV 240 from the first MVC pool 248 into the DR site VTL 236, modify or otherwise manipulate the dataset, and then migrate the modified dataset as VTV 292 into the third MVC pool 256 ("MVC Pool DR Test"). As discussed previously, the DR site 208 may have read-only access to the data in the first MVC pool 248 to allow the DR site retrieve and/or manipulate such data free of permanently modifying or deleting such data in the first MVC pool 248.

If it has been determined at 336 in FIG. 8 that the DR procedure has not yet ended, then the method 300 cycles back to 320 and 328 whereby data is created and/or at the production and DR sites and migrated 324, 332 to logical partitions/MVC pools as discussed above. When it has been determined that the DR procedure has ended at 336, then the method 300 may proceed to perform any appropriate cleanup procedures at the production and/or DR sites. For instance, the method 300 may read 340 data from the second logical partition of the DR site VLE (e.g., so as to empty the second logical partition for subsequent DR procedures) into VTVs of the production site VTL and then migrate 344 data back into the first logical partition of the DR site VLE. In this regard, operations at the production site 204 may seamlessly continue as if the DR procedure had never been performed and all production data had always been migrated to the first logical partition during the DR procedure.

It will be readily appreciated that many additions and/or deviations may be made from the specific embodiments disclosed in the specification without departing from the spirit and scope of the invention. In one embodiment, the production site VLE 228 may also be divided into a plurality of logical partitions for storage of production data created and/or edited at the production site 204. For instance, production data created and/or edited before declaration of a DR procedure could be stored in a VMVC of a first of a plurality of logical partitions of the production site VLE 228 and production data created and/or edited after declaration of the DR procedure could be stored in a VMVC of a second of the plurality of logical partitions of the production site VLE 228. In other arrangements, tape libraries made up of actual MVCs may be utilized as appropriate with the teachings presented herein as part of a comprehensive DR plan. The illustrations and discussion herein has only been provided to assist the reader in understanding the various aspects of the present disclosure. Furthermore, one or more various combinations of the above discussed arrangements and embodiments are also envisioned.

Embodiments disclosed herein can be implemented as one or more computer program products, i.e., one or more modules of computer program instructions encoded on a computer-readable medium for execution by, or to control the operation of, data processing apparatus. For example, the logic or software of the HSC 216 may be provided in such computer-readable medium of the host 212 and executed by a processor or processing engine (not shown) of the host 212 (not shown). The computer-readable medium can be a machine-readable storage device, a machine-readable storage substrate, a non-volatile memory device, a composition of matter affecting a machine-readable propagated signal, or a combination of one or more of them. In this regard, the DR setup 200 may encompass one or more apparatuses, devices, and machines for processing data, including by way of example a programmable processor, a computer, or multiple processors or computers. In addition to hardware, the DR setup 200 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide any of the functionalities described herein (e.g., performing DR testing, and the like) can be written in any appropriate form of programming language including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program may include, by way of example, both general and special purpose microprocessors, and any one or more processors of any kind of digital computer. Generally, a processor will receive instructions and data from a read-only memory or a random access memory or both. Generally, the elements of a computer are one or more processors for performing instructions and one or more memory devices for storing instructions and data. The techniques described herein may be implemented by a computer system configured to provide the functionality described.

While this specification contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A method for use in disaster recovery (DR), comprising:
migrating copies of one or more virtual tape volumes (VTVs) that store a first production dataset from a virtual tape library (VTL) of a production site to a first of a plurality of logical partitions of a virtual library extension (VLE) at a DR site over at least one network;
declaring a DR procedure at the production site; and
migrating copies of VTVs storing a second production dataset generated after the DR procedure declaration from the production site VTL to a second of the plurality of logical partitions of the DR site VLE, wherein the first production dataset was generated before the DR procedure declaration.

2. The method of claim 1, further comprising:
migrating copies of the one or more VTVs storing the first production dataset from the production site VTL to a local storage system at the production site.

3. The method of claim 2, wherein the local storage system comprises a VLE or a tape library.

4. The method of claim 1, further comprising:
marking the first logical partition as read-only in response to declaring the DR procedure.

5. The method of claim 1, further comprising during the DR procedure:
auditing the first logical partition to obtain copies of VTVs storing the first production dataset; and
populating one or more control data sets (CDSs) at the DR site with the audited and obtained first production dataset.

6. The method of claim 5, wherein the one or more CDSs are empty before the populating.

7. The method of claim 6, further comprising during the DR procedure:
auditing the second logical partition to obtain copies of VTVs storing the second production dataset; and
populating one or more additional CDSs at the DR site with the audited and obtained second production dataset, wherein an organization's data production operations are performed at the production site before DR procedure declaration, and further comprising after populating the one or more CDSs with the audited and obtained first and second production datasets:
continuing the organization's data production operations from the DR site.

8. The method of claim 1, further comprising during the DR procedure:
generating a third production dataset at the DR site;
storing the third production dataset in one or more virtual tape volumes (VTVs) of a VTL at the DR site; and
migrating the one or more VTVs storing the third production dataset from the DR site VTL to a third of the plurality of logical partitions at the DR site VLE.

9. The method of claim 8, further comprising during the DR procedure:
restricting the production site's access to the third logical partition; and
restricting the DR site's access to the second logical partition.

10. The method of claim 1, further comprising during the DR procedure:
modifying the first production dataset at the production site;
storing the modified first production dataset in one or more virtual tape volumes (VTVs) of the production site VTL;
migrating the one or more VTVs storing the modified first production dataset from the production site VTL to a local storage system at the production site; and
migrating copies of the one or more VTVs storing the modified first production dataset from the production site VTL to the second logical partition of the DR site VLE.

11. The method of claim 1, further comprising after the DR procedure declaration:
declaring a completion of the DR procedure;
reloading the first production dataset into one or more VTVs of the production site VTL;
reloading the second production dataset into one or more additional VTVs of the production site VTL;
migrating the first and second production datasets to the first logical partition of the DR site VLE; and
emptying the second logical partition of the DR site VLE.

12. The method of claim 1, wherein the plurality of logical partitions comprises a plurality of multi-volume cartridge (MVC) pools, wherein the VTV copies are migrated to a first MVC pool of the DR site VLE.

13. A system, comprising:
a processor; and
a memory logically connected to the processor and comprising a set of computer readable instructions executable by the processor to:
migrate one or more virtual tape volumes (VTVs) storing a first production dataset from a virtual tape library (VTL) at a production site to a first of a plurality of logical partitions of a virtual library extension (VLE) at a disaster recovery (DR) site over at least one network;
declare a start to a DR procedure at the production site;
perform at least one of editing and creating at least one production dataset at the production site after declaration of the DR procedure; and
migrate one or more VTVs storing the edited and/or created at least one production dataset from the VTL to a second of the plurality of logical partitions of the DR site VLE over the at least one network.

14. The system of claim 13, wherein the memory comprises another set of computer readable instructions executable by the processor during the DR procedure to:
read the one or more VTLs storing the first production dataset from the first logical partition of the VLE into a VTL at the DR site;
modify the one or more VTLs storing the first production dataset at the DR site; and
migrate the modified one or more VTLs storing the first production dataset to a third of the plurality of logical partitions at the VLE.

15. A method, comprising:
first receiving, in a first of a plurality of logical partitions of a virtual library extension (VLE) at a disaster recovery (DR) site, one or more virtual tape volumes (VTVs) storing first production data from a virtual tape library (VTL) of a production site over at least one network; and
second receiving, in a second of the plurality of logical partitions of the DR site VLE, one or more VTVs storing second production data from a VTL of the DR site, wherein the second receiving occurs after declaration of a DR procedure between the production site and the DR site.

16. The method of claim 15, further comprising:
generating or modifying the second production data at the DR site.

17. The method of claim 15, further comprising:
reading data from the first logical partition of the DR site VLE into the DR site VTL;
modifying the read data;
migrating the modified read data into the second logical partition, wherein the modified read data is the second production data.

18. The method of claim 15, further comprising:
third receiving, in a third of the plurality of logical partitions of the DR site VLE, one or more VTVs storing third production data from the production site.

19. The method of claim 18, wherein the third receiving occurs after declaration of the DR procedure between the production site and the DR site.

20. The method of claim 15, further comprising during the DR procedure:
  restricting the production site's access to the second logical partition; and
  restricting the DR site's access to the first logical partition.

* * * * *